United States Patent [19]

Takemura et al.

[11] Patent Number: 5,733,977
[45] Date of Patent: Mar. 31, 1998

[54] SOLID GOLF BALL

[75] Inventors: Kouhei Takemura, Nara; Akihiro Nakahara, Ibaraki, both of Japan

[73] Assignee: Sumitomo Rubber Industries, Ltd., Hyogo-ken, Japan

[21] Appl. No.: 614,799

[22] Filed: Mar. 7, 1996

[30] Foreign Application Priority Data

Mar. 9, 1995 [JP] Japan .................. 7-079566

[51] Int. Cl.$^6$ .................. C08F 8/00
[52] U.S. Cl. .................. 525/105; 524/908; 473/372; 473/377
[58] Field of Search .................. 473/372, 377; 525/105; 524/908

[56] References Cited

U.S. PATENT DOCUMENTS

| | | | |
|---|---|---|---|
| 3,784,209 | 1/1974 | Berman et al. | 473/377 |
| 4,955,966 | 9/1990 | Yuki et al. | 473/359 |
| 5,010,137 | 4/1991 | Umeda et al. | 525/104 |
| 5,143,957 | 9/1992 | Hashimoto et al. | 524/397 |

FOREIGN PATENT DOCUMENTS 61-258844  11/1986  Japan .

Primary Examiner—Karen A. Dean
Attorney, Agent, or Firm—Birch, Stewart, Kolash & Birch, LLP

[57] ABSTRACT

The present invention provides a solid golf ball which is superior in shot feel and attains long flight distance. The solid golf ball comprises a core and a cover covering the core, wherein the core is prepared by vulcanizing a rubber composition comprising a base rubber obtained by mixing silicone rubber and a diene rubber under conditions wherein crosslinking of the diene rubber does not occur but crosslinking of the silicone rubber does occur, and wherein the mixing ratio of silicone rubber to the diene rubber is within the range of 5:95 to 45:55 by weight.

15 Claims, 1 Drawing Sheet

SOLID GOLF BALL

FIELD OF THE INVENTION

The present invention relates to a solid golf ball. More particularly, it relates to a solid golf ball which is superior in shot feel and attains long flight distance.

BACKGROUND OF THE INVENTION

A solid golf ball normally has characteristics such as high rebound performance, long flight distance, etc., but has the problem in that shot feel is inferior to that of a thread wound golf ball.

Therefore, various attempts for making the feeling at the time of hitting soft (i.e. softening appropriately) so as to improve shot feel have been made. For example, Japanese Laid-Open Patent Publication No. 61-258844 suggests that a silicone rubber is formulated in a core of the solid golf ball to improve shot feel.

However, when the silicone rubber is merely formulated in a butadiene rubber which is a main material of the rubber component of the core, the rebound performance is deteriorated, which results in reduction of flight distance. Therefore, short fiber is formulated as a hardness modifier to improve rebound performance, but may cause poor dispersion of the short fiber. In order to prevent this, the mixing time must be prolonged and, therefore, causes the problem of poor productivity.

As described above, the solid golf ball has poor shot feel. In addition, regarding the suggestion of formulating the silicone rubber to improve shot feel, the short fibers must be formulated as the hardness modifier so as to compensate for the deterioration of the rebound performances. However, poor dispersion is liable to arise by formulating the short fibers. In order to prevent this, the mixing time must be prolonged and, therefore, causes a problem that the productivity becomes inferior.

OBJECTS OF THE INVENTION

The main object of the present invention is to provide a solid golf ball, which has good shot feel and attains long flight distance, without addition of the short fibers as a hardness modifier.

This object as well as other objects and advantages of the present invention will become apparent to those skilled in the art from the following description with reference to the accompanying drawing.

SUMMARY OF THE INVENTION

Figure 1:
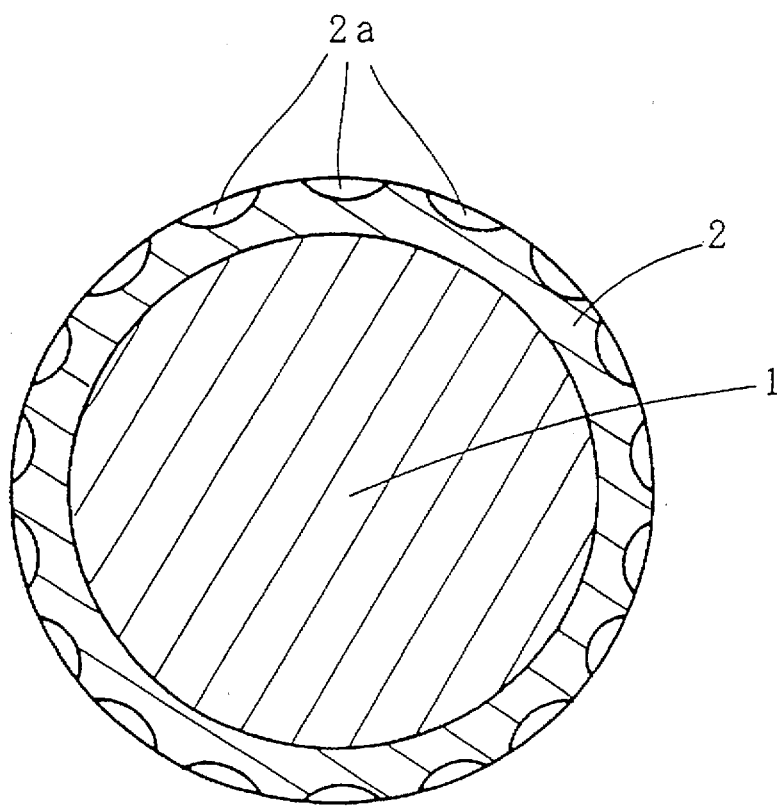
FIG. 1 is a schematic cross section illustrating one embodiment of the solid golf ball of the present invention.

The present invention provides a solid golf ball which is superior in shot feel and attains long flight distance without causing the deterioration of rebound performance. The solid golf ball comprises a core and a cover covering the core, wherein the core is prepared by vulcanizing a rubber composition comprising a base rubber obtained by mixing silicone rubber and a diene rubber under conditions wherein crosslinking of the diene rubber does not occur but crosslinking of the silicone rubber does occur, and, wherein a mixing ratio of silicone rubber to the diene rubber is within the range of 5:95 to 45:55 by weight.

The progress from beginning to the completion of the present invention will be explained. The present inventors have studied the reason why rebound performance deteriorated when butadiene rubber and silicone rubber were mixed in accordance with the proposal of the prior art. It is predicted that butadiene rubber and silicone rubber were not sufficiently compatible with each other, and both rubbers form a microstructure, such as a lamellar structure, so as to cause phase separation.

Therefore, the present inventors have considered that the silicone rubber is finely dispersed in the butadiene rubber. If the fine dispersion of both rubbers is sufficiently conducted, it has been found that the butadiene rubber as the matrix maintains high rebound performance and the finely dispersed silicone rubber brings about soft feeling at the time of hitting. It has also been found that the fine dispersion of silicone rubber into butadiene rubber is attained by using the concept of dynamic crosslinking wherein silicone rubber is mixed with butadiene rubber under conditions such that only the silicone rubber is crosslinked but the butadiene rubber is not crosslinked.

DETAILED DESCRIPTION OF THE INVENTION

The term "dynamic crosslinking" generally means that a rubber is crosslinked in a molten thermoplastic resin with mixing. The present inventors believe that it can be considered as a kind of dynamic crosslinking when a rubber is mixed with another rubber under conditions such that one rubber is crosslinked but the other rubber is not crosslinked. In the present invention, therefore, it is referred to as dynamic crosslinking to mix silicone rubber with a diene rubber under conditions such that the silicone rubber is crosslinked but the diene rubber is not crosslinked.

The dynamic crosslinking of silicone rubber in the butadiene rubber under conditions such that the silicone rubber is crosslinked but the diene rubber is not crosslinked is conducted by selecting a crosslinking agent which does not crosslink the diene rubber but crosslinks silicone rubber, and by selecting a catalyst which accelerates the reaction thereof.

Examples of the crosslinking agents for dynamically crosslinking silicone rubber are a silicone oil having two or more Si—H groups in one molecule, such as methylhydrodiene silicone oil, dimethylmethylhydrodiene silicone oil, etc. Examples of the catalysts are platinatic chloride etc. Examples of the silicone rubbers are silicone rubbers having two or more vinyl groups in one molecule, such as methylvinyl silicone rubber, dimethyl silicone rubber having vinyl groups at both terminal ends, etc. The crosslinking reaction of the silicone rubber due to the crosslinking agent such as methylhydrodiene silicone oil, etc. is generally referred to as a hydrosilylation reaction.

The amount of the crosslinking agent required for dynamically crosslinking the silicone rubber is preferably 0.1 to 5 parts by weight, particularly 0.5 to 3 parts by weight, based on 100 parts by weight of the silicone rubber. When the amount of the crosslinking agent is less than the above range, the dynamic crosslinking does not proceed sufficiently. Therefore, it is difficult to finely disperse the silicone rubber. On the other hand, when the amount of the crosslinking agent exceeds the above range, the excess crosslinking agent remains in the form of oily substance and a problem of molding arises and causes the deterioration of rebound performance. In addition, an amount of the catalyst is preferably $1 \times 10^{-6}$ to $3 \times 10^{-3}$ g, particularly $1.0 \times 10^{-5}$ to $5.0 \times 10^{-4}$ g, based on 1 g of the crosslinking agent. When the amount of the catalyst is less than the above range, the crosslinking reaction of the silicone rubber does not take place easily and it is difficult to finely disperse the silicone rubber. On the other hand, when the amount of the catalyst exceeds the above range, no problem occurs about reaction, but an excess amount of the catalyst is wasteful, which results in high cost.

The condition of the dynamic crosslinking is not specifically limited, but it is preferred that the dynamic crosslinking is conducted at 80° to 130° C. for 1 to 30 minutes. The dynamic crosslinking can be empirically conducted, for example, using a laboplast mill manufactured by Toyo Seiki Co., Ltd. It is preferred to conduct the dynamic crosslinking in an industrial scale using a closed kneader or an extruder.

The mixing ratio of silicone rubber to diene rubber is preferably 5:95 to 45:55 (weight ratio). That is, when the proportion of the silicone rubber is less than the above range, shot feel is not sufficiently improved. On the other hand, when the proportion of the silicone rubber exceeds the above range, it is difficult to finely disperse crosslinked particles of the rubber at the time of dynamic crosslinking. Therefore, the rebound performance is deteriorated because large particles of the silicone rubber remain as they are. It is particularly preferred that the mixing ratio of silicone rubber to butadiene rubber is 15:85 to 35:65 (weight ratio).

The diene rubber used in the present invention includes butadiene rubber (BR), styrene-butadiene rubber (SBR), acrylonitrile-butadiene rubber (NBR), ethylene-propylene-diene rubber (EPDM), natural rubber (NR), a mixture thereof and the like. It is preferred that the butadiene rubber is a high-cis butadiene rubber having a cis content of not less than 60%, particularly not less than 80%, is preferred.

In the present invention, the rubber composition for producing a core contains the dynamically crosslinked rubber mixture of silicone rubber and the diene rubber as base rubber. The rubber composition generally contains, in addition to the base rubber, a crosslinking agent for crosslinking the diene rubber, fillers, initiators, etc. The rubber composition may optionally contain other chemicals to be used for the rubber formulation, e.g. antioxidants, additives, crosslinking auxiliaries, etc.

The crosslinking agent for crosslinking the diene rubber can be α,β-unsaturated carboxylic acids (e.g. acrylic acid, methacrylic acid, etc.) and their metal salts (e.g. zinc salts, magnesium salts, etc.). Among them, zinc salts of α,β-unsaturated carboxylic acids (e.g. zinc acrylate, zinc methacrylate, etc.) are particularly preferred.

The filler includes zinc oxide, barium sulfate, silica, etc. Among them, zinc oxide is particularly preferred.

The initiator includes dicumyl peroxide, benzoyl peroxide, 2,5-dimethyl-2,5-di(tert-butyl-peroxy)hexyne-3, etc. Among them, dicumyl peroxide is particularly preferred.

The rubber component is mainly composed of the dynamically crosslinked rubber mixture of silicone rubber and the diene rubber. The wording "the mixture of the above dynamically crosslinked rubber and non-crosslinked rubber is used as base rubber" means both that the whole rubber component is composed of only the dynamically crosslinked rubber mixture of silicone rubber and the diene rubber and that the rubber component may contain other rubbers, in addition to the dynamically crosslinked rubber mixture, as long as the characteristics of the addition of the dynamically crosslinked rubber mixture are not adversely affected. Examples of the other rubbers are such as butadiene rubber, styrene-butadiene rubber, natural rubber, acrylonitrile-butadiene rubber, ethylene-propylene-diene rubber, etc. It is preferred that when the other rubber is added, an amount of the dynamically crosslinked rubber mixture of silicone rubber and the diene rubber is not less tan 70% by weight, particularly not less than 80% by weight, based on the total amount of the rubber component.

The amount of the crosslinking agent is preferably 15 to 45 parts by weight, particularly 20 to 35 parts by weight, and an amount of the filler is preferably 5 to 30 parts by weight, particularly 15 to 25 parts by weight, both being based on 100 parts by weight of the rubber component. The amount of the initiator is preferably 0.2 to 3 parts by weight, particularly 0.8 to 2.3 parts by weight, based on 100 parts by weight of the rubber component.

That is, when the amount of the crosslinking agent is less than 15 parts by weight, based on 100 parts by weight of the rubber component, the crosslink density is insufficient and the core is soft, which results in deterioration of rebound performance. When the amount of the crosslinking agent exceeds 45 parts by weight, based on 100 parts by weight of the rubber component, it is liable to be so hard that softness obtained by the dynamic crosslinked rubber mixture is lost. When the amount of the filler is less than 5 parts by weight, based on 100 parts by weight of the rubber component, the specific gravity does not satisfy the specification and it is impossible to obtain a sufficient hardness. On the other hand, when the amount of the filler exceeds 30 parts by weight, based on 100 parts by weight of the rubber component, the specific gravity is too large and the core is liable to be brittle. When the amount of the initiator is less than 0.2 pad by weight, based on 100 parts by weight of the rubber component, it is impossible to conduct the crosslinking sufficiently, which results in insufficient hardness. On the other hand, when the amount of the initiator exceeds 3 parts by weight, based on 100 parts by weight of the rubber component, the core is brittle and its durability is liable to be inferior.

In addition, the rubber composition for core is crosslinked and molded, for example, by heating at the temperature of 140° to 170° C. under pressure for 10 to 40 minutes.

The cover is not specifically limited, and various covers (e.g. thermoplastic resin cover, balata cover, etc.) can be used. For example, the cover can be obtained by adding a pigment such as titanium dioxide in the ionomer resin.

A method of covering the cover on the core is not specifically limited, but may be a conventional method. For example, there can be used a method comprising molding a cover composition into a semi-spherical half-shell in advance, covering a core with two half-shells and then subjecting to a pressure molding at 100° to 170° C. for 1 to 15 minutes, or a method of injection-molding the cover composition directly on a core to cover the core. The thickness of the cover is generally about 1 to 4 mm. In case of cover molding, a dimple may be optionally formed on the surface of the ball. Further, a paint or marking may be optionally provided.

Then, one embodiment of the solid golf ball of the present invention will be explained with reference to the accompanying drawing.

FIG.1 is a schematic cross section illustrating one embodiment of the solid golf ball of the present invention. The solid golf ball shown in FIG.1 is a two-piece solid golf ball. In FIG.1, 1 is a core, 2 is a cover and 2a is a dimple.

The core 1 is composed of a vulcanized article of the rubber composition which contains the dynamically crosslinked rubber mixture of silicone rubber and the diene rubber as base rubber, as described above. The solid golf ball shown in FIG. 1 is a two-piece solid golf ball wherein a core 1 is directly covered with a cover 2, but it may be a solid golf ball having a multi-layer structure (of three or more layers) wherein an intermediate layer is provided between the core 1 and cover 2, or a solid golf ball having a two-layer cover 2.

The suitable number/embodiment of dimples 2a may be optionally provided on the cover 2 of the golf ball so as to obtain the desired characteristics. Furthermore, painting, marking, etc. may be optionally provided on the surface of the golf ball.

As described above, according to the present invention, there could be provided a solid golf ball which is superior in shot feel and attains long flight distance.

EXAMPLES

The following Examples and Comparative Examples further illustrate the present invention in detail but are not to be construed to limit the scope thereof. In the Examples and Comparative Examples, "percents" which indicate the concentration are by weight unless otherwise stated.

Examples 1 to 5 and Comparative Examples 1 to 4

Firstly, the base rubber of the rubber composition for core was prepared according to the formulation shown in Tables 1 to 2.

In the preparation stage of the base rubber, a butadiene rubber was used as the rubber which is not crosslinked, and a methylvinyl silicone rubber was used as the rubber which is subjected to dynamic crosslinking. In addition, a methylhydro silicone oil was used as the crosslinking agent and a 1% isopropanol platinatic chloride solution was used as a catalyst.

The dynamic crosslinking is conducted at 120° C. for 20 minutes, and the kneading is also conducted under the same condition. Regarding the rubber which is not subjected to dynamic crosslinking in the Comparative Example, the kneading is also conducted at 120° C. for 20 minutes.

The unit of the amount of the respective components in Tables 1 to 2 is "g" (provided that the unit of the amount of the 1% isopropanol platinatic chloride solution is "μg" and, therefore, the unit thereof is described in Tables 1 to 2). In Tables 1 and 2, those represented by the trade name will be explained in detail, following Table 2. Since the amount of the 1% isopropanol platinatic chloride solution to be used as the catalyst is very small in comparison with the other components. Therefore, in order to represent the amount of the 1% Isopropanol platinatic chloride solution, the amount of the other components is represented by the unit of "g". The practical amount is more larger.

TABLE 1

| | | Example No. | | | | |
|---|---|---|---|---|---|---|
| | | 1 | 2 | 3 | 4 | 5 |
| BR11 | ※ 1 | 95 | 85 | 75 | 65 | 55 |
| KE7020U | ※ 2 | 5 | 15 | 25 | 35 | 45 |
| SH1107 | ※ 3 | 0.2 | 0.3 | 0.5 | 0.7 | 1.0 |
| 1% Isopropanol solution of platinatic chloride | | 1 μg | 3 μg | 5 μg | 7 μg | 10 μg |
| Dynamic crosslinking | | Conducted | Conducted | Conducted | Conducted | Conducted |

TABLE 2

| | | Comparative example No. | | | |
|---|---|---|---|---|---|
| | | 1 | 2 | 3 | 4 |
| BR11 | ※ 1 | 100 | 50 | 75 | 75 |
| KE7020U | ※ 2 | 0 | 50 | 25 | 25 |
| SH1107 | ※ 3 | 0 | 1.0 | 0 | 0.5 |
| 1% Isopropanol solution of platinatic chloride | | 0 | 10 μg | 0 | 5 μg |
| Dynamic crosslinking | | None | Conducted | None | None |

※ 1: BR11 (trade name), high-cis butadiene rubber (cis-butadiene content: 90% or more) manufactured by Japan Synthetic Rubber Co., Ltd.
※ 2: KE7020U (trade name), methylvinyl silicone rubber manufactured by Shin-etsu Chemical Co., Ltd.
※ 3: SH1107 (trade name), methylhydrodiene silicone oil manufactured by Toray Dow Corning Co., Ltd.

Then, 28 parts by weight of zinc acrylate, 20 parts by weight of zinc oxide and 1.0 part by weight of dicumyl peroxide were formulated to 100 parts by weight of the base rubber thus prepared as described above, and the mixture was kneaded to prepare a rubber composition for core, respectively.

The resulting rubber composition was charged in a mold for core, and then compressed with heating at 160° C. for 30 minutes to produce a core having a diameter of 38.5 mm.

Then, a cover composition obtained by formulating 2 parts by weight of titanium dioxide to 100 parts by weight of an ionomer resin was injection-molded around the above core to produce a two-piece solid golf ball having an outer diameter of 42.7 mm. The ionomer resin of the above cover composition is a mixture obtained by mixing Hi-milan 1605 (trade name) with Hi-milan 1706 (trade name) in a weight ratio of 50:50. Hi-milan 1605 (trade name) is an ionomer resin neutralized with a sodium ion, manufactured by Mitsui Du Pont Polychemical Co., Ltd., and Hi-milan 1706 (trade name) is an ionomer resin neutralized with a zinc ion, manufactured by Mitsui Du Pont Polychemical Co., Ltd.

The ball weight, flight distance (carry) and shot feel of the resulting golf ball were examined. The results are shown in Tables 3 and 4. The measuring method of the flight distance and evaluation method of shot feel are as follows.

Flight Distance

A swing robot manufactured by True Temper Co. is fit with a No. 1 wood club and a golf ball is hit at a head speed of 45 m/second to measure a distance (yard) of the golf ball to the dropping point. Eight golf balls are measured for the respective Examples and Comparative Examples and the results are shown by the average value.

Shot Feel

Five top golfers including professional golfers actually hit the golf ball with a No.1 wood club, and shot feel of the respective players is classified into the following five grades.

Evaluation Criteria

◯: Soft and good
◯H: Slightly hard, but is within good range.
◯S: Slightly soft, but is within good range.
XH: Hard and inferior
XG: Too soft and heavy, inferior

TABLE 3

| | Example 1 | Example 2 | Example 3 | Example 4 | Example 5 |
|---|---|---|---|---|---|
| Ball weight (g) | 45.2 | 45.4 | 45.3 | 45.3 | 45.4 |
| Flight distance (yard) | 223 | 223 | 222 | 221 | 220 |
| Shot feel | ◯H | ◯ | ◯ | ◯ | ◯S |

TABLE 4

| | Comparative example 1 | Comparative example 2 | Comparative example 3 | Comparative example 4 |
|---|---|---|---|---|
| Ball weight (g) | 45.3 | 45.4 | 45.2 | 45.3 |
| Flight distance (yard) | 219 | 206 | 213 | 213 |
| Shot feel | XH | XS | XS | XS |

As is apparent from a comparison in ball characteristics between the golf balls of Examples 1 to 5 shown in Table 3 and those of Comparative Examples 1 to 4 shown in Table 4, the golf balls of Examples 1 to 5 were superior in shot feel and attained a large flight distance.

That is, the golf balls of Examples 1 to 5 using the dynamically crosslinked mixture of silicone rubber and the diene rubber (weight ratio: 5:95 to 45:55) as the base rubber of the core were superior in shot feel and attained a longer flight distance.

To the contrary, the golf ball of Comparative Example 1 using a butadiene rubber as the base rubber of the core according to a conventional technique attained a long flight distance, but the hit feeling was hard and inferior. Regarding the golf ball of Comparative Example 2 wherein a large amount of silicone rubber was dynamically crosslinked with butadiene rubber, the flight distance was lowered and shot feel is too soft and inferior because the amount of the dynamically crosslinked silicone rubber was too large. Regarding the golf balls of Comparative Examples 3 and 4 using silicone rubber which was not dynamically crosslinked with butadiene rubber, the rebound characteristics were deteriorated, which results in decrease in flight distance.

What is claimed is:

1. A solid golf ball comprising a core and a cover covering said core, wherein said core is prepared by vulcanizing a rubber composition comprising a base rubber obtained by mixing silicone rubber and a diene rubber under conditions wherein crosslinking of the diene rubber does not occur but crosslinking of the silicone rubber does occur, and wherein a mixing ratio of silicone rubber to the diene rubber is within the range of 5:95 to 45:55 by weight.

2. The solid golf ball according to claim 1, wherein the diene rubber is selected from the group consisting of butadiene rubber, styrene-butadiene rubber, acrylonitrile-butadiene rubber, ethylene-propylene-diene rubber, natural rubber and a mixture thereof.

3. The solid golf ball according to claim 2, wherein said butadiene rubber is a high-cis butadiene rubber having a cis content of not less than 60%.

4. The solid golf ball according to claim 1, wherein said silicone rubber is a silicone rubber having two or more vinyl groups in each molecule.

5. The solid golf ball according to claim 1, wherein said silicone rubber is selected from the group of methylvinyl silicone rubber, dimethyl silicone rubber having vinyl groups at both terminal ends and a mixture thereof.

6. The solid golf ball according to claim 1, wherein the step of mixing the silicone rubber and the diene rubber under conditions wherein crosslinking of the diene rubber does not occur but crosslinking of the silicone rubber does occur is conducted by selecting a crosslinking agent which does not crosslink the diene rubber but crosslinks silicone rubber, and by selecting a catalyst which accelerates the reaction thereof.

7. The solid golf ball according to claim 6, wherein the crosslinking agent is a silicone oil having two or more Si—H groups in each molecule.

8. The solid golf ball according to claim 7, wherein said silicone oil is selected from the group consisting of methylhydrodiene silicone oil, dimethylmethylhydrodiene silicone oil and a mixture thereof.

9. The solid golf ball according to claim 6, wherein said catalyst is platinatic chloride.

10. The solid golf ball according to claim 6, wherein said crosslinking agent is present in an amount of 0.1 to 5 parts by weight, based on 100 parts by weight of the silicone rubber.

11. The solid golf ball according to claim 6, wherein said catalyst is present in an amount of $1 \times 10^{-6}$ to $3 \times 10^{-3}$ g, based on 1 g of the crosslinking agent.

12. The solid golf ball according to claim 1, wherein said rubber composition further comprises a crosslinking agent for crosslinking the diene rubber, a filler and an initiator.

13. The solid golf ball according to claim 1, wherein said cover is an ionomer resin cover.

14. The solid golf ball according to claim 3, wherein said silicone rubber is selected from the group of methylvinyl silicone rubber, dimethyl silicone rubber having vinyl groups at both terminal ends and a mixture thereof.

15. The solid golf ball according to claim 14, wherein the step of mixing the silicone rubber and the diene rubber under conditions wherein crosslinking of the diene rubber does not occur but crosslinking of the silicone rubber does occur is conducted by selecting a crosslinking agent which does not crosslink the diene rubber but crosslinks silicone rubber, and wherein the crosslinking agent is a silicone oil having two or more Si—H groups in each molecule.

* * * * *